(12) United States Patent
Farrar et al.

(10) Patent No.: US 6,863,176 B2
(45) Date of Patent: Mar. 8, 2005

(54) APPARATUS FOR HOLDING A COMPACT DISK

(75) Inventors: Peter Antony Farrar, Leeds (GB); Anthony Henry Joseph Fraser, Northants (GB); Stefan Alexander Pijanowski, Oundle (GB)

(73) Assignee: DUBOIS, Ltd. (GB)

( * ) Notice: Subject to any disclaimer, the term of this patent is extended or adjusted under 35 U.S.C. 154(b) by 200 days.

(21) Appl. No.: 09/954,535

(22) Filed: Sep. 18, 2001

(65) Prior Publication Data

US 2003/0052024 A1 Mar. 20, 2003

Related U.S. Application Data

(63) Continuation of application No. PCT/GB00/01001, filed on Mar. 17, 2000.

(30) Foreign Application Priority Data

Mar. 18, 1999 (GB) .............................................. 9906066

(51) Int. Cl.$^7$ .............................................. B65D 85/57
(52) U.S. Cl. ..................................... 206/308.1; 206/313
(58) Field of Search ............................. 206/308.1, 309, 206/310, 311, 312, 313, 232

(56) References Cited

U.S. PATENT DOCUMENTS

| | | | |
|---|---|---|---|
| 5,251,750 A | | 10/1993 | Gelardi et al. |
| 5,586,651 A | | 12/1996 | Krummenacher |
| 5,685,427 A | | 11/1997 | Kuitems et al. |
| 5,788,068 A | | 8/1998 | Fraser et al. |
| 5,887,713 A | | 3/1999 | Smith et al. |
| 5,944,181 A | | 8/1999 | Lau |
| 6,041,923 A | * | 3/2000 | Furutsu ................... 206/308.1 |
| 6,170,656 B1 | * | 1/2001 | Cerda-Vilaplana et al. ....................... 206/308.1 |
| 6,196,384 B1 | * | 3/2001 | Belden, Jr. ............... 206/308.1 |
| 6,206,186 B1 | * | 3/2001 | Cerda-Vilaplana et al. ....................... 206/308.1 |
| 6,237,763 B1 | * | 5/2001 | Lau .......................... 206/308.1 |
| 6,523,683 B1 | * | 2/2003 | Fraser et al. ............. 206/308.1 |

FOREIGN PATENT DOCUMENTS

| | | |
|---|---|---|
| GB | 2312665 A | 11/1997 |
| JP | 50 501082 | 3/1993 |
| WO | WO 97/41563 A1 | 11/1997 |

* cited by examiner

Primary Examiner—Jacob K. Ackun, Jr.
(74) Attorney, Agent, or Firm—MeadWestvaco Corporation; Michael V. Drew, Esq.

(57) ABSTRACT

The apparatus comprises: a base portion (1); inwardly extending radial arms (2) resiliently cantilevered from the base portion (1); disk-engaging means (3) at the inner ends of the arms (2) for releasably engaging the central hole of a disk (11) and supporting the center of the disk (11) away from the base portion (1). Each arm (2) has first pivot means (9) in the region where the arm (2) joins the base portion (1) and second pivot means (10) radially inward thereof. Depression of the disk-engaging means (3) towards the base portion (1) causes the inner ends of the arms (2) and the center of the disk (11), to be depressed towards the base portion (1), the arms (2) initially pivoting about the first pivot means (9) and subsequently pivoting about the second pivot means (10) until retention of the disk (11) by the disk-engaging means (3) is released. This enables the thickness of the apparatus to be reduced, e.g. to 4 mm or less. Due to the presence of the second pivot means (10), the periphery of the base portion (1) also tends to rise when the disk-engaging means (3) is depressed to help in ejecting the disk (11).

23 Claims, 5 Drawing Sheets

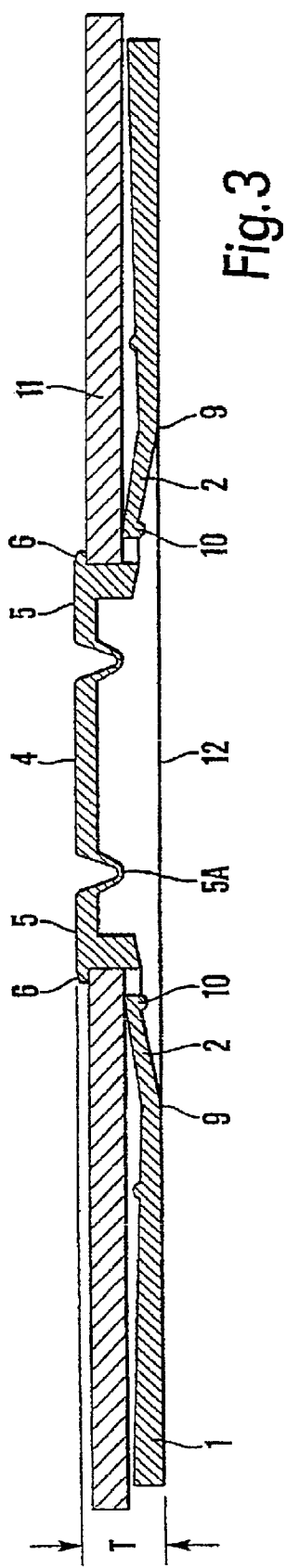
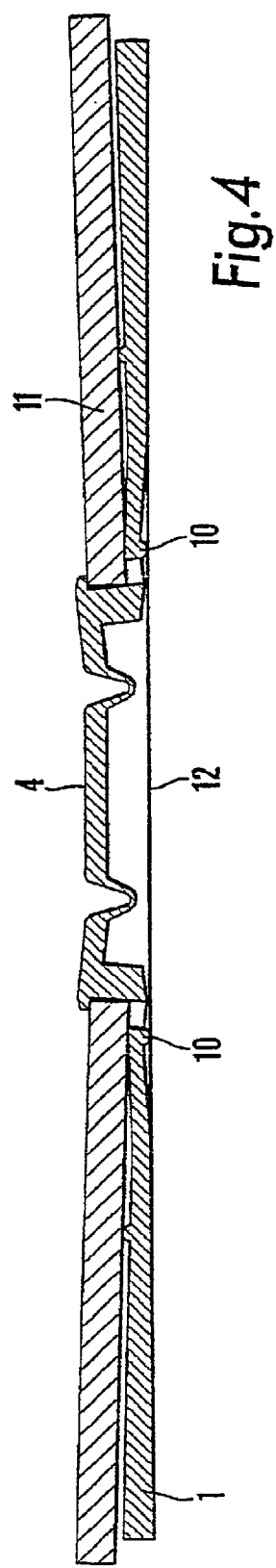
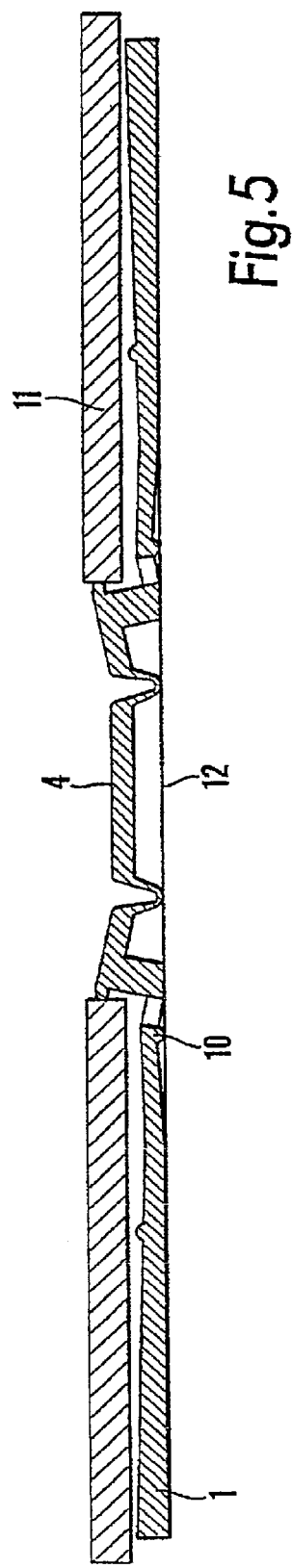

APPARATUS FOR HOLDING A COMPACT DISK

CROSS-REFERENCE TO RELATED APPLICATIONS

This application is a continuation of prior PCT Application PCT/GB00/01001, filed Mar. 17, 2000.

TECHNICAL FIELD

This invention relates to apparatus for holding a compact disk.

BACKGROUND ART

The invention relates to further improvements of the apparatus described in WO-A-96/14636 and WO-A-97/41563. The disclosure of this prior art is hereby incorporated in the present specification. Such known apparatus comprises a base portion, inwardly extending radial arms resiliently cantilevered from the base portion and disk-engaging means at the inner ends of the arms for releasably engaging the central hole of the disk. The invention aims to improve upon the release action of the disk-engaging means and enable the thickness of the apparatus, from the upper surface of the disk-engaging means to the underside of the base portion, to be reduced.

DISCLOSURE OF INVENTION

According to the present invention, there is provided apparatus for holding a compact disk having a central hole, the apparatus comprising: a base portion; at least one inwardly extending radial arm resiliently cantilevered from the base portion; disk-engaging means at the inner end of the said at least one arm for releasably engaging the central hole of the disk and supporting the centre of the disk away from the base portion; the or each arm having first pivot means in the region where it joins the base portion and second pivot means radially inward of the first pivot means; the arrangement being such that depression of the disk-engaging means towards the base portion causes the inner end of the said at least one arm, and at least a central portion of the disk, to be depressed towards the base portion, the arm initially pivoting about the first pivot means and subsequently pivoting about the second pivot means until retention of the disk by the disk-engaging means is released.

According to a second aspect of the invention, there is provided apparatus for holding a compact disk having a central hole, the apparatus comprising a base portion; at least two inwardly extending radial arms resiliently cantilevered from the base portion; and disk engaging means provided at the inner end of the arms for releasably engaging the central hole of the disk and supporting the centre of the disk away from the base portion, the arrangement being such that depression of the disk engaging means towards the base portion causes the inner ends of the arms, and at least a central portion of the disk to be depressed towards the base portion until retention of the disk by the disk-engaging means is released, and the base portion to flex such that radially outer portions thereof are raised relative to a central area thereof so the radially outer portions engage the periphery of the disk and assist in lifting the disk away from the disk engaging means.

According to another aspect of the invention, there is provided apparatus for holding a compact disk having a central hole, the apparatus comprising: a base portion; at least one inwardly extending radial arm resiliently cantilevered from the base portion; and disk-engaging means at the inner end of the said at least one arm for releasably engaging the central hole of the disk, the arrangement being such that the thickness of the apparatus from the top of the disk-engaging means to the underside of the base portion is 4 mm or less.

Preferred and optional features of the invention will be apparent from the following description of specific embodiments and from the subsidiary claims of the specification.

It should be notes that references to movement towards the base portion as used herein are to be interpreted to include movement towards a plane defined by parts of the base portion, such as the plane of the surface 12 shown in the Figures.

BRIEF DESCRIPTION OF DRAWINGS

The invention will now be further described, merely by way of example, with reference to the accompanying drawings, in which:

FIGS. 3, 4 and 5 are side views of the apparatus taken along line A—A in

FIG. 2 illustrating operation of various aspects of the present invention,

BEST MODE OF CARRYING OUT THE INVENTION

Figure 1:
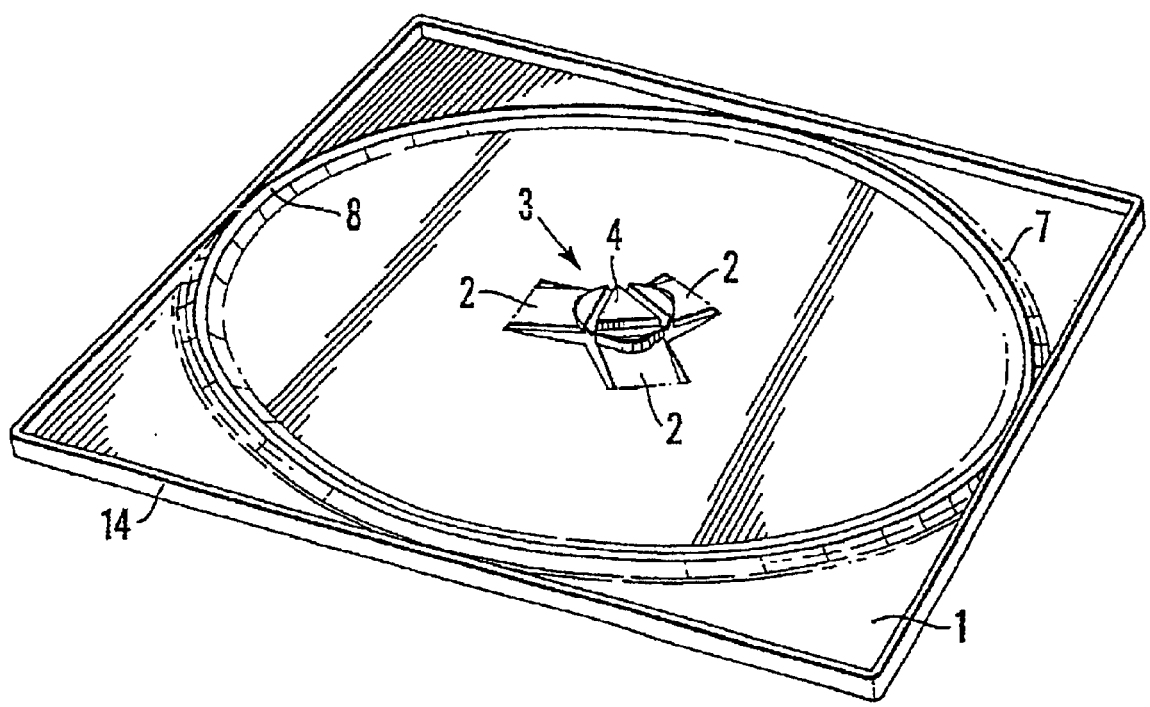
FIG. 1 is a perspective view of apparatus which can be constructed according to the invention.
Figure 2:
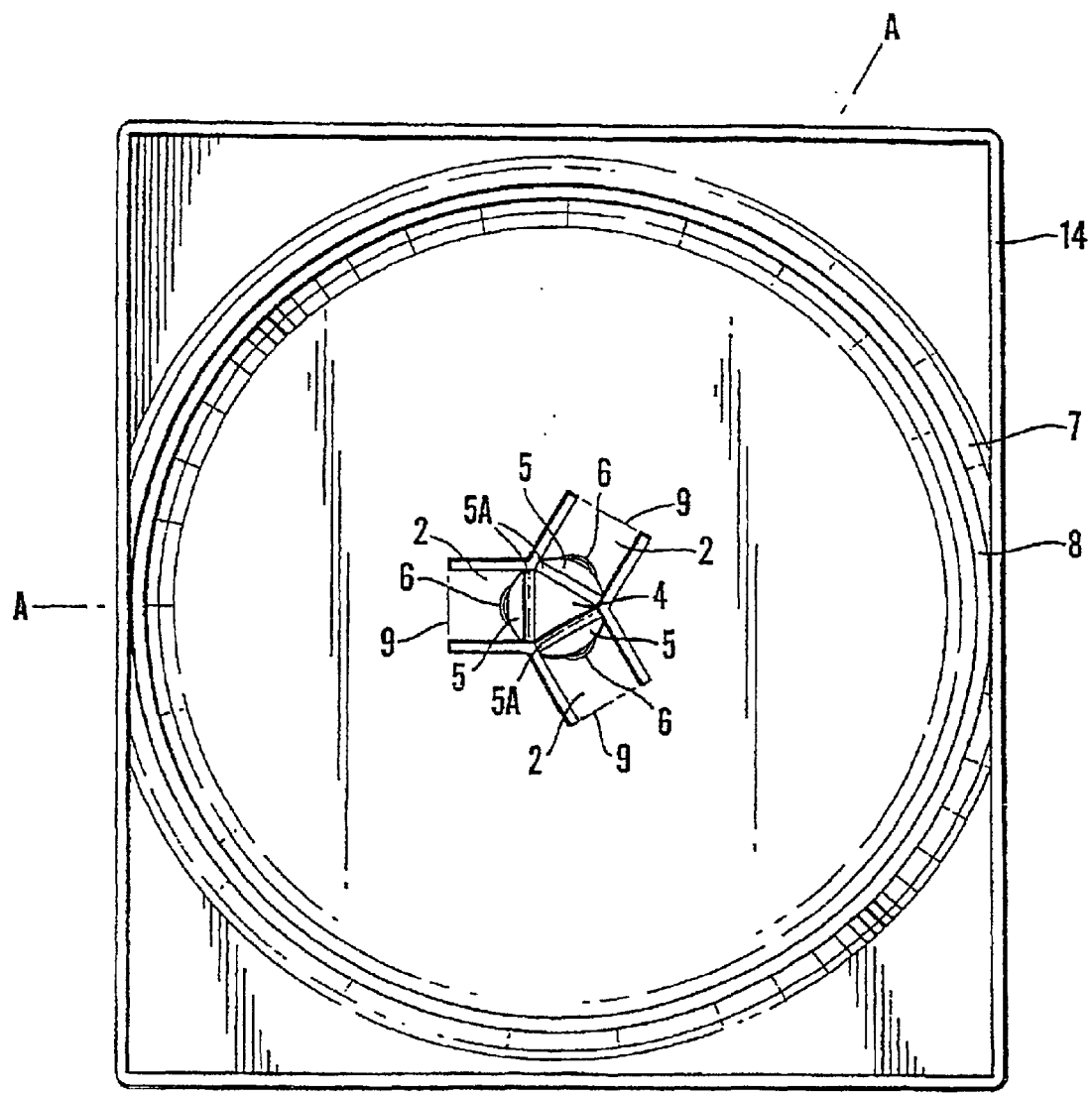
FIG. 2 is a plan view of the apparatus shown in FIG. 1.

FIGS. 1 and 2 illustrate apparatus for holding a compact disk 11 (see FIGS. 3, 4 and 5), the apparatus comprising a base portion 1, three inwardly extending radial arms 2 resiliently cantilevered from the base portion 1, and disk-engaging means (indicated generally at 3) at the inner ends of the arms 2 for releasably engaging the central hole of the disk. The disk-engaging means comprising a central triangular portion 4 and three sector-shaped portions 5 each connected by a hinge 5A to one side of the triangular portion 4 so, together, they provide a generally circular button-like member. Each of the sector-shaped portions is carried at the inner end of a respective arm 2 and is provided with a projection 6, or lip (see FIGS. 3, 4 and 5), for engaging the upper surface of a disk and, thus, retaining the disk on the apparatus.

The apparatus also has a raised portion 7 which, in use, extends around the periphery of the disk so as to limit the scope for movement of the disk within its own plane and, whilst the disk is held on the apparatus, to inhibit access to the periphery of the disk. A step 8 is provided on the inner edge of the raised portion 7. The arrangement is such that, to release a disk held on the apparatus, it is necessary to depress the button-like portion. This causes the projections 6 to depress the disk towards the base portion 1 until the periphery of the disk engages the step 8. Further depression of the button-like member causes the projections to depress the centre of the disk further towards the base portion, and so flex the disk, until the arms 2 have been depressed to such an extent that the projections 6 have moved inwardly a sufficient distance so as to disengage from the upper surface of the disk and are able to pass through the central aperture of the disk. The disk is then free to revert to an unstressed, flat shape so the centre of the disk "pops" up above the projection 6 and so that, when the button-like member is released, the projections 6 do not re-engage the disk. The operation of the disk-engaging means and the use of disk flexing to help eject the disk in this manner are described further in WO-A-96/14636 and WO-A-97/41563.

One difference between the apparatus shown in FIGS. 3 to 5 and that disclosed in WO-A-96/14636 and WO-A-97/41563 is that the arms 2 are modified so that the depression of the projections 6, and their inward movement as they are depressed, occurs in two stages. The arms 2 are arranged so that each has two pivots, a first pivot 9 in the region where the arm 2 joins the base portion 1, and a second pivot 10 radially inward thereof. In the embodiment illustrated in FIGS. 3, 4 and 5, the second pivot comprises a projection 10 on the underside of each arm 2 towards the inner end thereof.

FIG. 3 shows a cross-sectional view of the apparatus holding a disk 11 (taken along line A—A which extends along two of the arms 2). When the button-like member is pressed, each of the arms 2 initially flexes and/or pivots about the first pivot 9 in a similar manner to the apparatus described in WO-A-96/14636 and WO-A-97/41563. The arm 2 moves through an angle of about 6 degrees (about the pivot 9) during this first stage of the depression to the position shown in FIG. 4. In this position, the projections 6 still firmly retain the disk 11 on the apparatus. However, the projections 10 on the underside of the arms 1 now engage a surface 12 (e.g. a desk top or table top) on which the apparatus is lying. Further depression of the button-like member thus causes the innermost portions of the arms 2 to flex and/or pivot about the second pivot 10. The innermost portions of the arms 2 and the projections 6 are thus pivoted inwards until the projections 6 disengage from the upper surface of the disk. As the disk is no longer retained by the projections 6, it is free to move away from the projections 6, e.g. by ejection due to the resilience of the disk causing the centre of the disk 11 to move upwards as the disk reverts to an unflexed state as described above.

The projection 10 may comprise a narrow ridge extending laterally across the underside of each arm 2 and projecting from the underside thereof by a distance of 0.5–1.0 mm, and preferably about 0.75 mm.

When the innermost portions of the arms 2 flex and/or pivot about the second pivot 10, the projections 6 move inwardly more rapidly for a given depression of the button-like member than when the arms flex and/or pivot about the first pivot 9. Accordingly, the apparatus retains the advantages of the apparatus described in WO-A-96/14636 and WO-A-97/41563 but the thickness T of the device, i.e. the distance between the upper surface of the triangular portion 4 (in its undepressed state) and the underside of the base portion 1, can be reduced. This thickness dimension T is shown in FIG. 3.

Known devices made in accordance with WO-A-96/14636 and WO-A-97/41563 have been made with a thickness in the range 4.3–7 mm. By using the features described in the present specification, the thickness T can be reduced to 4 mm or less and, preferably, to 3 mm or less. In the example illustrated in FIGS. 3–5, for instance, the thickness of the projections 6 (i.e. from the upper surface of the button-like member to the underside of the projections) is about 0.4 mm, the thickness of a standard CD or DVD is about 1.2 mm, the underside of the CD is held about 0.3 mm away from the upper surface of the base portion and the thickness of the base portion (from the upper surface of the step 8 to the underside of the base portion) is about 1.0 mm, giving the apparatus an overall thickness T of about 2.9 mm.

As indicated above, FIG. 3 shows a disk 11 held in the apparatus prior to depression of the button 4. FIG. 4 shows the position of the apparatus after the arms 2 have been depressed by 6 degrees about the first pivot point 9 and shows the depression of the centre of the disk 11 relative to the periphery of the disk, this depression being caused by the projections 6 which still engage the upper surface of the disk in the position shown in FIG. 4. FIG. 5 shows the position of the apparatus, after depression of the innermost portion of the arms through a further 6 degrees about the second pivot 10, to a position in which the projections 6 have moved inwardly a sufficient distance to release their engagement on the upper surface of the disk 11 so they can pass through the central aperture of the disk. It will be seen that the projections 6 have been depressed between the position shown in FIGS. 3 and 5 by a distance of about 1 mm, i.e. less than the thickness of the disk. However, in practice, it is found that the momentum of the centre of the disk 11, as the disk reverts to its unflexed state, can be sufficient to lift the underside of the centre of the disk above the upper surface of the projections so that the projections 6 do not re-engage the inner wall of the aperture when the button 4 is released.

In the arrangement shown, it is also found that further depression of the button 4 in the position shown in FIG. 5, causes the base portion 1 to flex so that radially outer portions thereof, including the step 8, are raised relative to the central area thereof, whereby the radially outer portions engage the periphery of the disk 11 and assist in lifting the disk away from the projections 6. Thus, depression of the button 4 in the position shown in FIG. 5 causes the step 4 to rise and so help lift the disk away from the disk-engaging means. Such flexing of the base portion is believed to arise due to a tilting or see-saw action about the first and/or second pivot; as the inner end of the arm is depressed, there is a tendency for parts of the base portion radially outward of the pivot(s) to rise as, although the arm 2 may flex to some extent at the first and/or second pivot 9, 10, the material from which the apparatus is made is sufficiently stiff to transmit downward motion of the arm on one side of the pivot to upward motion of the base portion on the other side of the pivot. It is also believed that tension induced in the upper surface of the base portion 1 as the button 4 is further depressed assists in causing the base portion to flex in this manner. This is believed to be enhanced by the fact that the button 4 is connected via the hinges 5A to the arms 2 and hence to the base portion 1. However, such flexing of the base portion may not be dependent upon the button portions being connected by said hinges.

As will be appreciated from FIGS. 3 to 5, the initial movement of the arm 2 about the first pivot point 9 comprises some flexing of the connection between the arm 2 and the base portion 1 so the angle therebetween is reduced (compare FIG. 4 to FIG. 3) as well as some pivoting about the angular corner between the arm 2 and the base portion 1 on the underside of the apparatus. The movement about the second pivot point 10 may also comprise some flexing of the angle between the innermost portion of the arm and the portion between the pivot points 9 and 10, but, due to the narrow ridge-like shape of the projection 10, movement about pivot 10 is predominantly caused by pivoting of the arm 2 about the fulcrum provided by projection 10 which tends to cause the portions of the arm 2 and base portion 1 radially outward thereof to rise as the innermost portion of the arm is depressed.

The pivoting movement about the first pivot 9 may also be enhanced by the use of a shorter arm 2 which, in the position shown in FIG. 3, is therefore angled upwards at a steeper angle relative to the base portion 1 compared to apparatus with longer arms 2. This pivoting action at the first pivot 9 can also be further enhanced by the provision of a projection (not shown), such as a lateral ridge, on the underside of the apparatus in the region where the arm 2 joins the base portion 1. This projection need only project from the underside of the apparatus by a small distance, e.g. 0.5 mm or less.

The projection 10 preferably projects from the underside of the arms 2 by a distance in the range 0.5 mm–1.0 mm.

These features, either individually or together, thus help ensure the disk is "cleanly" released when the button 4 is depressed even though the apparatus has a thickness T of less than 3 mm.

Figure 6:
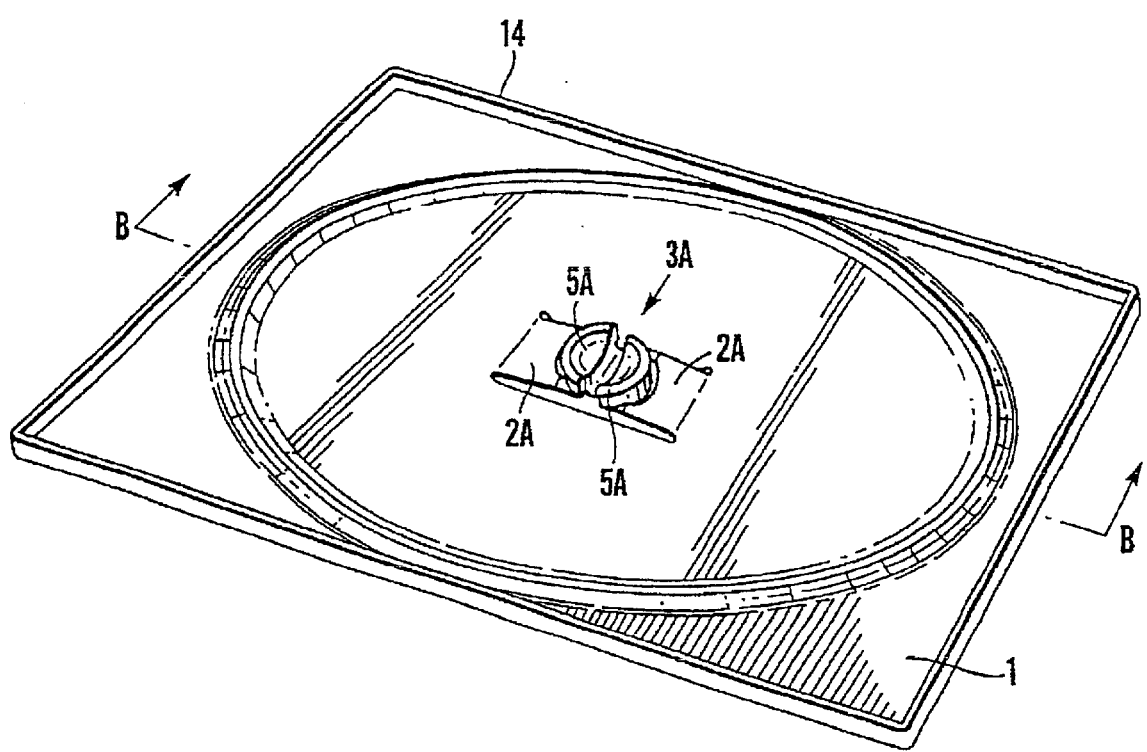
FIG. 6 is a perspective view of another form of apparatus which can be constructed according to the invention.
Figure 7:
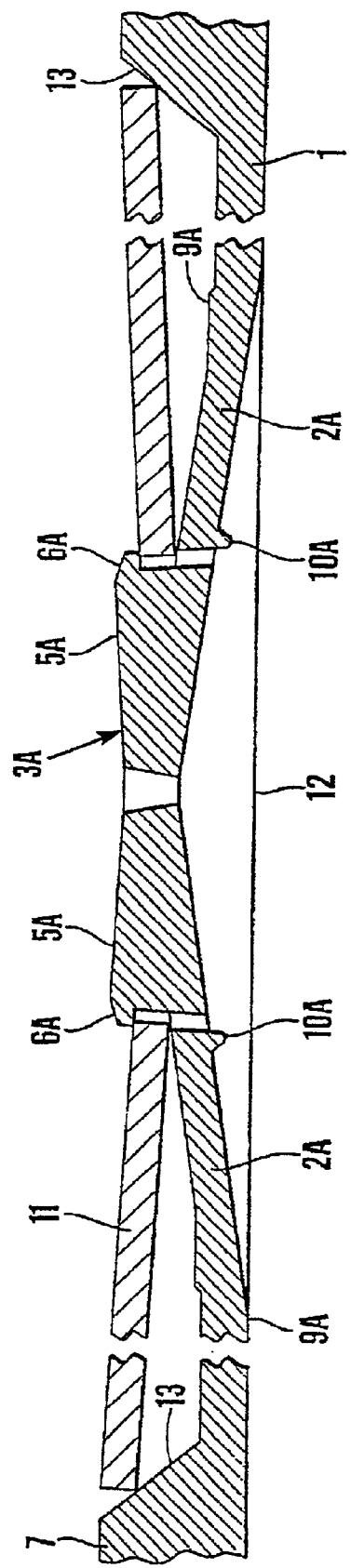
FIG. 7 is a side view taken along line B—B of the apparatus shown in FIG. 6.

FIG. 6 shows a perspective of another version of apparatus for holding a compact disk. This is similar to that shown in FIGS. 1–5 except that the disk engaging means comprises two inwardly extending radial arms 2A and semi-circular portions 5A at the inner ends thereof which together form a generally circular button-like member 3A. Each of the semi-circular portions is provided with a projection 6A, or lip (see FIG. 7) for engaging the upper surface of a disk and thus retaining the disk on the apparatus. This apparatus functions in essentially the same manner as described above for the three-arm version of the apparatus. As shown in FIGS. 6 and 7 the semicircular portions 5A need not be interconnected by a hinge but, in some cases, it may be desirable for the two portions to be interconnected, e.g. by a hinge. The two portions 5A may also have other shapes which, together, form a generally circular button-like member.

FIG. 7 shows a cross sectional view of the apparatus shown in FIG. 6 taken along line B—B thereof. This view shows the apparatus in a position in which the button-like member 3A is partially depressed (and flexing of the disk 11 caused thereby is shown in FIG. 7) but not depressed to the extent that projections. 10A on the undersides of the arms 2A have yet engaged the surface 12 on which the apparatus is supported. The peripheral portions of the disk 11 are shown supported by an inclined surface 13 which provides a similar function to the step 8 described above in relation to FIGS. 1 to 5.

Each of the arms 2A in the embodiment shown in FIGS. 6 and 7, initially flexes and/or pivots about a first pivot 9A where the arm joins the base portion, and subsequently, about a second pivot provided by a projection 10A on the underside of the arm 2A radially inward of the pivot 9A, as the button 3A is depressed in a similar manner to that described above in relation to the embodiment shown in FIGS. 1 to 5.

A number of other changes can be made to the apparatus to help reduce the thickness of the apparatus and are described below.

The scope for downward movement of the centre of the disk 11 can be increased, without increasing the thickness T of the apparatus, by reducing the thickness of the central area of the base portion 1. Thus, the thickness of the base portion may be tapered so it reduces in a radially inward direction from the step 8 to a region at a radius of about 7.5 mm from the centre of the device. Indeed, the base portion may taper gradually from a thickness of about 1.0 mm adjacent the periphery of the disk to a thickness of about 0.7 mm adjacent the periphery of the central aperture of the disk, without the need for an abrupt change of thickness to provide the step 8. Making the central area of the base portion thinner than the outer areas thereof also tends to encourage the base portion to flex so the outer areas thereof rise when the button 3 is depressed.

The thickness T of the apparatus can also be reduced by adjusting the length of the arms 2,2A the size of the projections 6,6A and the thickness of the button 3,3A.

The projections 6,6A move inwards more rapidly if the distance between the projections 6,6A and the first pivot 9,9A is reduced. In the arrangement shown, the first pivot 9,9A is preferably 15 mm or less from the centre of the apparatus but more preferably 12.5 mm or less therefrom. The second pivot means 10,10A is preferably at least 3 mm and most preferably at least 5 mm radially inward of the first pivot means 9,9A.

If the overlap between the projections 6,6A and the upper surface of the disk 11 (in the undepressed state) is reduced, the projections 6,6A will need to move inwardly a smaller distance to release their engagement on the upper surface of the disk 11. On the other hand, the overlap should be sufficient to provide positive retention of the disk (and to allow for minor variations in the radius of the aperture of different disks). The projections 6,6A preferably overlap the upper surface of the disk 11 (with the apparatus in the undepressed state) by 0.5 mm or less, and preferably 0.4 mm or less, but the minimum overlap is preferably 0.2 mm.

The button 3,3A is preferably flat and preferably has a thickness of 0.6 mm or less and most preferably 0.4 mm or less. However, it should preferably have a minimum thickness of about 0.2 mm otherwise, the projections 6,6A may become too weak or flexible.

As indicated above, there are several features which assist in ejecting the disk so that it 'pops up' when released from the engagement by the lips 6 and is not re-engaged thereby when the button 3 is released: flexing of the centre of the disk downwards causes the centre of the disk to rise again once the engagement of the lips is released; during this reversion of the disk to its unflexed state, the centre of the disk may rise past its initial position (shown in FIG. 3) due to momentum of the centre of the disk; and upward flexing of the outer regions of the base portion assists in lifting the disk.

In some embodiments, all these factors may contribute to ejection of the disk. However, as the thickness of the apparatus is reduced (described further below), the movement caused by the upward flexing of outer portions of the base portion may change from merely assisting in ejection of the disk to becoming of equal importance to the ejection caused by flexing of the disk and, in some cases, flexing of the base portion may be essential to ensure satisfactory ejection of the disk.

The features described above thus enable the thickness of the apparatus to be reduced. This is an advantage as there is a desire to produce slimmer packaging to enable more disks to be stored in a given space. However, it will be appreciated that the features described may also be used to improve the functioning of the apparatus without necessarily reducing the thickness thereof.

As described in WO-A-96/14636 and WO-A-97/41563, the raised portion or upstand 7 surrounds or partially surrounds the periphery of the disk so as to inhibit access to the edge of a disk held on the apparatus by a user's finger until the disk is released from the disk-engaging means 3,3A. This deters users from attempting to remove the disk by lifting the edge of the disk and encourages them to release the disk by operating the disk-engaging means.

Parts of the raised portion or upstand 7 may be of reduced height to facilitate access to the edge of the disk once it has been released from the disk-engaging means.

The apparatus is preferably arranged so it can be manufactured by a one-shot injection moulding process. In particular, apertures are provided in the arms 2,2A to enable the projections or lips 6,6A to be formed during such a process.

The apparatus may be integrally formed as part of a wall of a container or box and, in this case, is typically formed of an amorphous plastics material such as polyethylene. However, the apparatus may also be formed as a tray for insertion in a separate container, or for mounting in a cover or sleeve in which case it is typically formed of a crystalline plastics material such as polystyrene or a co-polymer of polystyrene and butadiene. Such a tray may also be provided with a removable cover or film.

The apparatus shown in FIGS. 1 and 6 are in the form of a tray for insertion into a container, mounting within a cover or a sleeve or sealing with a removable cover or film. As shown, a further upstand 14 is provided around the periphery of the apparatus.

As indicated above, the apparatus is designed so that it can be made with a thickness T of 4 mm or less and preferably 3 mm or less. In the latter case, the apparatus e.g. when in the form of a tray as shown in FIG. 1 or 6, may be mounted within a cardboard cover which is adhered to the underside of the apparatus, extends around one edge of the apparatus and extends across the upperside of the apparatus, and the overall thickness of the device, including the thickness of the cardboard cover above and below the tray, may be 4 mm or less.

What is claimed is:

1. Apparatus for holding a compact disk having a central hole, the apparatus comprising: a base portion; disk-engaging means for releasably engaging the central hole of the disk and supporting the center of the disk away from the base portion; the disk-engaging means being provided with at least one projection for retaining the disk on the apparatus, and being provided at the radially inner end(s) of one or more arms, each of which is resiliently cantilevered from the base portion and extends radially inward therefrom to the disk-engaging means, and each arm having first pivot means in the region where it joins the base portion and second pivot means radially inward of the first pivot means between the first pivot means and the disk-engaging means; whereby depression of the disk-engaging means towards the base portion causes the radially inner end of each arm, and at least a central portion of the disk, to be depressed towards the base portion, the disk-engaging means intially pivoting about the first pivot means and subsequently pivoting about the second pivot means until radially inward movement of the projection(s) of the disk-engaging means is sufficient to release retention of the disk by the disk-engaging means.

2. Apparatus as claimed in claim 1 in which the second pivot means is at least 3 mm radially inward of the first pivot means.

3. Apparatus as claimed in claim 1 in which the projections are arranged so as to overlap the upper surface of a disk held thereon by a distance in the range of 0.2 to 0.5 mm.

4. Apparatus as claimed in claim 1 in which the first pivot means is at a distance from the center of the apparatus of 15 mm or less.

5. Apparatus as claimed in claim 1 comprising two or three arms.

6. Apparatus as claimed in claim 5 in which the inner ends of the arms form a button-like member for depression by a user's finger.

7. Apparatus as claimed un claim 6 in which each arm has a portion of the button-like member provided at its inner end, the portions on the respective arms being interconnected.

8. Apparatus as claimed in claim 1 arranged such that depression of the disk-engaging means causes the base portion to flex so that radially outer portions thereof rise relative to a central area thereof and so assist in lifting the disk away from the disk-engaging means.

9. Apparatus as claimed in claim 1 which a central area of the base portion is thinner than radially outer portions thereof to enable the center of the disk to be depressed further.

10. Apparatus as claimed in claim 1 comprising a peripheral support for supporting the periphery of a disk when the disk-engaging means is initially depressed, whereby further depression of the disk-engaging means, and hence of a central area of the disk, causes the center of the disk to be flexed toward the base portion.

11. Apparatus as claimed in claim 1 comprising an upstand provided on the base portion for surrounding, or partially surrounding, the periphery of a disk held thereon so as to inhibit access to the edge of the disk by a user's finger until the disk has been released from the disk-engaging means.

12. Apparatus as claimed in claim 1 formed of plastics material.

13. Apparatus as claimed in claim 12 arranged to enable it to be formed by a one-shot injection molding process.

14. Apparatus as claimed in claim 12 integrally formed as part of a container.

15. Apparatus as claimed in claim 13 formed as a tray for providing with a cover or insertion into a container.

16. Apparatus, as claimed in claim 1, in which the second pivot means comprises a projection on the underside of each respective arm.

17. Apparatus as claimed in claim 16 in which the projection comprises a ridge extending laterally across the underside of each respective arm.

18. Apparatus as claimed in claim 17 in which the projection projects from the underside of the at least one radial arm by a distance of 0.5–1.0 mm.

19. Apparatus for holding a compact disk having a central hole, the apparatus comprising a base portion; at least two inwardly extending radial arms resiliently cantilevered from the base portion; and disk engaging means provided at the inner end of the arms for releasably engaging the central hole of the disk, whereby depression of the disk engaging means towards the base portion causes the inner ends of the arms, and at least a central portion of the disk to be depressed towards the base portion until retention of the disk by the disk-engaging means is released, and including means causing the base portion to flex and the radially outer portions thereof to be raised relative to a central area thereof upon further depression of the disk-engaging means, whereby said radially outer portions engage the periphery of the disk and assist in lifting the disk away from the disk engaging means.

20. Apparatus as claimed in claim 19 in which upward movement of the radially outward portions of the base portion is enhanced by forming each radial arm so that it joins the base portion at a pivot point which is arranged such that depression of the arm tends to cause radially outer portions of the base portion to rise rather than just flexing the arm relative to the base portion.

21. Apparatus for holding a compact disk having a central hole, the apparatus comprising: a base portion; at least one inwardly extending radial arm resiliently cantilevered from the base portion; disk-engaging means at the inner end of the at least one arm for releasably engaging the central hole of the disk, and the at least one arm having first pivot means in the region where it joins the base portion and second pivot means radially inward of the first pivot means, the thickness of the apparatus from the top of the disk-engaging means to the underside of the base portion being 4 mm or less.

22. Apparatus as claimed in claim 21 mounted within a cover, in which the overall thickness, including the thickness of the cover, is 4 mm or less.

23. Apparatus for holding a compact disk having a central hole, the apparatus comprising: a base portion; at least one inwardly extending radial arm resiliently cantilevered from the base portion; disk-engaging means at the inner end of the at least one arm for releasably engaging the central hole of the disk and supporting the center of the disk away from the base portion; the at least one arm having first pivot means in the region where it joins the base portion and second pivot means radially inward of the first pivot means; said second pivot means comprising a projection on the underside of the at least one arm; whereby depression of the disk-engaging means towards the base portion causes the inner end of the said at least one arm, and at least a central portion of the disk, to be depressed towards the base portion, the at least one radial arm intially pivoting about the first pivot means and subsequently pivoting about the second pivot means until inward movement of the disk-engaging means is sufficient to release retention of the disk by the disk-engaging means.

\* \* \* \* \*